US005182575A

United States Patent [19]

Kato et al.

[11] Patent Number: 5,182,575

[45] Date of Patent: Jan. 26, 1993

[54] IMAGE FORMING APPARATUS

[75] Inventors: Motoi Kato, Yokohama; Yoshitake Nagashima, Chigasaki, both of Japan

[73] Assignee: Canon Kabushiki Kaisha, Tokyo, Japan

[21] Appl. No.: 598,186

[22] Filed: Oct. 16, 1990

[30] Foreign Application Priority Data

Oct. 17, 1989 [JP] Japan ................................ 1-268226

[51] Int. Cl.[5] ................................................ G01D 9/42

[52] U.S. Cl. ................................... 346/108; 346/160; 355/200; 355/228; 355/233; 355/239; 358/296

[58] Field of Search ............... 355/202, 228, 229, 232, 355/233, 208, 239; 346/108, 160, 153.1, 154; 358/296, 298, 300, 302

[56] References Cited

U.S. PATENT DOCUMENTS

| | | | |
|---|---|---|---|
| 3,787,887 | 1/1974 | Burton | 346/108 |
| 4,089,008 | 5/1978 | Suga et al. | 346/108 X |
| 4,387,983 | 6/1983 | Masegi | 346/160 |
| 4,476,474 | 10/1984 | Kitamura | 346/160 |
| 4,499,437 | 2/1985 | Blazey | 346/108 X |
| 4,517,579 | 5/1985 | Kitamura | 346/160 |
| 4,723,138 | 2/1988 | Hashimoto et al. | 346/160 |
| 4,768,043 | 8/1988 | Saito et al. | 346/108 |
| 4,797,749 | 1/1989 | Paulsen | 358/302 |
| 4,800,442 | 1/1989 | Riseman | 358/280 |
| 4,809,021 | 2/1989 | Check et al. | 346/108 |
| 4,878,068 | 10/1989 | Suzuki | 346/108 |
| 4,905,022 | 2/1990 | Nagasawa | 346/108 |
| 4,905,023 | 2/1990 | Suzuki | 346/108 |
| 5,017,944 | 5/1991 | Kitamura et al. | 346/108 |
| 5,134,495 | 7/1992 | Frazier et al. | 358/298 |

*Primary Examiner*—A. T. Grimley
*Assistant Examiner*—Matthew S. Smith
*Attorney, Agent, or Firm*—Fitzpatrick, Cella, Harper & Scinto

[57] ABSTRACT

This disclosure relates to an image forming apparatus in which an image is formed by deflecting a light beam a minute distance in a sub-scanning direction every pixel of image data. By controlling the emission intensity of the light beam utilizing a $\gamma$ correction, and by controlling the emission time of the light beam utilizing PWM control, the beam spot can be adjusted to control the dot size of the image. Accordingly, the dot density in image formation can be raised by minute deflection in the sub-scanning direction, and the reproducibility of characters and graphics is improved, particularly in the oblique direction. Furthermore, tone reproducibility of multi-tone image data is enhanced by minute deflection in the sub-scanning direction and adjustment of image dot size.

23 Claims, 15 Drawing Sheets

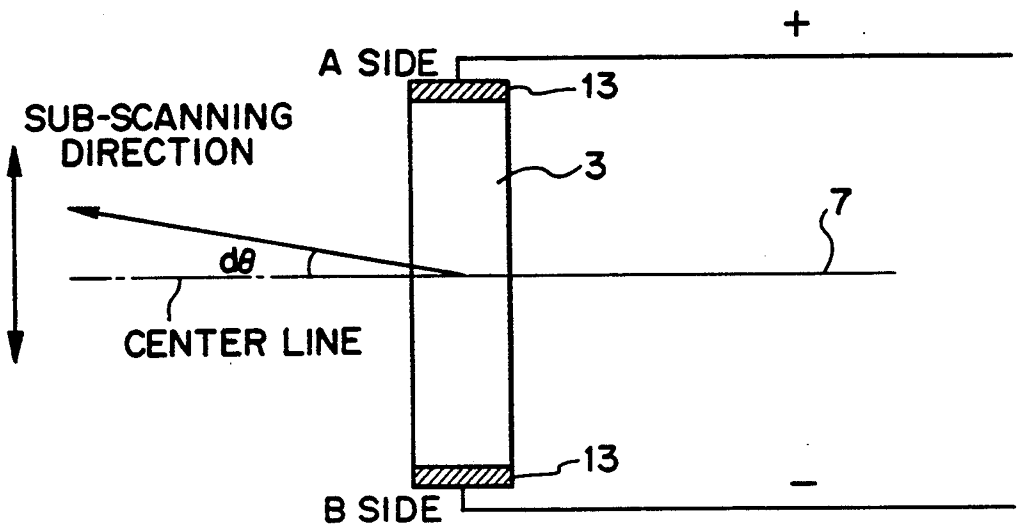
F I G. 5A
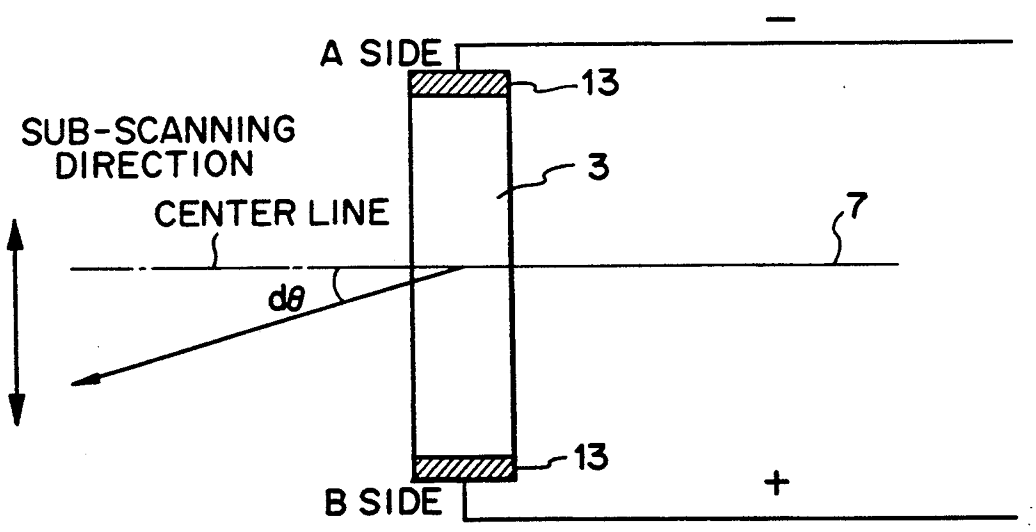
F I G. 5B

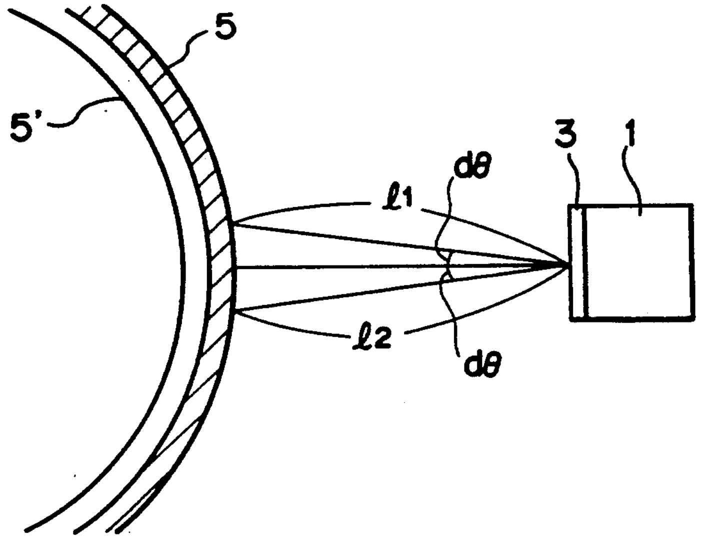
F I G. 6A
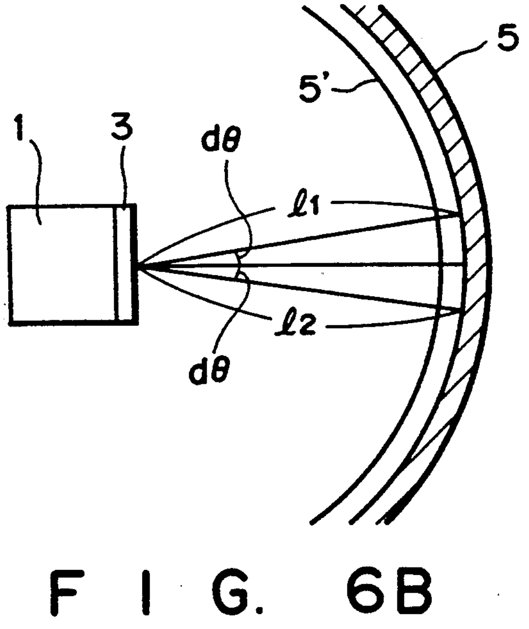
F I G. 6B

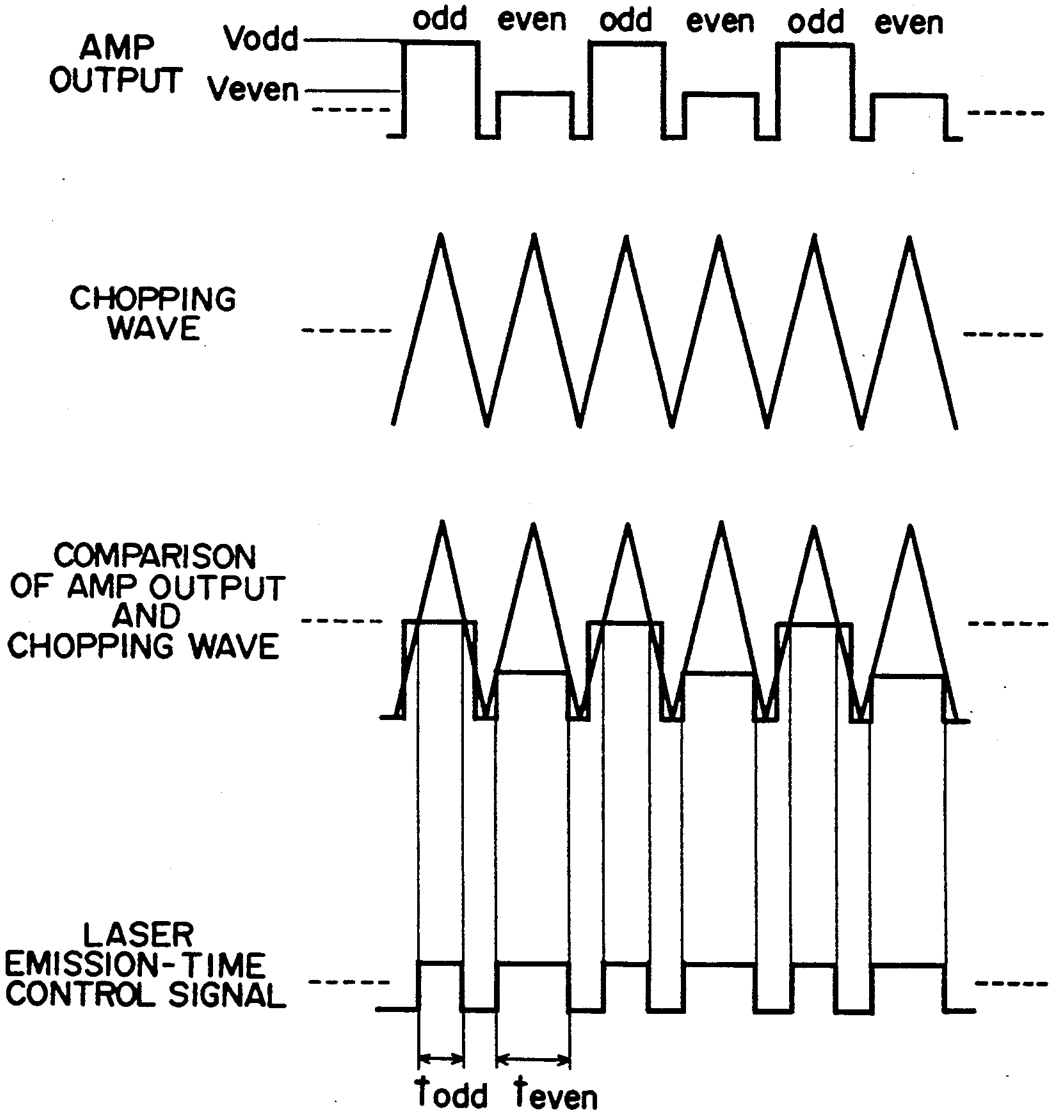
F I G. 9B

IMAGE FORMING APPARATUS

BACKGROUND OF THE INVENTION

1. Field of the Invention

This invention relates to an image forming apparatus in which a light beam is adopted as an exposure source.

2. The Prior Art

The market for desktop type printers has developed remarkably in recent years. In particular, use of electrophotographic-type laser-beam printers has rapidly become widespread owing to the image quality and high speed of these printers. Technological progress has been accompanied by a reduction in the size and price of these printers, and large numbers of printers for personal use have appeared on the market. In order to satisfy the need for more natural representation of character fonts and multi-tone representation of graphic images, printers are required to have a higher resolution and an improved multi-tone capability.

However, in a case where a digital image is expressed with the conventional products, the pixel array is a lattice-like matrix array, and therefore the occurrence of a so-called "jagged" image cannot be avoided when reproducing slanting or oblique lines. Even if a somewhat higher resolution is provided, the oblique-line portions of character fonts and the representation of graphic images still develop pronounced jaggedness and the apparent quality of image data representation declines.

SUMMARY OF THE INVENTION

An object of the present invention is to provide an image forming apparatus in which the representation quality of the oblique lines of character fonts and graphics can be greatly improved and, at the same time, tone reproducibility also can be improved and a high-resolution image of high tonality obtained.

According to the present invention, the foregoing object is attained by providing an image forming apparatus in which a light beam is adopted as an exposure source, comprising: light-emitting means for emitting the light beam; photoreceptive means on which a latent image is formed in correspondence with a beam spot formed by irradiating the photoreceptive means with the light beam; converting means for converting the light beam, which is emitted by the light-emitting means, so as to scan the photoreceptive means; beam deflecting means for deflecting the beam spot a minute distance in a sub-scanning direction when the light beam is deflected in a main scanning direction; and control means for controlling the beam deflecting means.

An another objective of the present invention is to provide an image forming apparatus which creates a smooth representation of image data by deflecting a light beam off of the image data.

In accordance with the present invention as described above, a laser beam is deflected a small distance in the sub-scanning direction, when the laser beam is deflected in the main scanning direction, in synchronization with an image signal using a beam deflector that employs an AOD (an acoustic optical device) or an EOD (an electric optical device), thereby making it possible to scan the region between neighboring main scanning lines. Since the density of pixels in the sub-scanning direction also is increased, the jaggedness of oblique lines is no longer pronounced. This makes possible a more precise representation of character fonts.

The invention is particularly advantageous since the oblique lines of a graphic image or the like can be provided with excellent reproducibility. By doubling dot density even in a multi-tone image such as a photograph or applying a different $\gamma$ characteristic to a doubled number dots, a higher tone reproduction is possible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B are diagrams illustrating the principle of deflection in which a laser beam from an EOD is deflected in the sub-scanning direction;

FIGS. 6A and 6B are diagrams illustrating the positional relationship between a photoreceptor drum and a laser light source;

FIG. 9B is a timing chart of laser emission-time control signals;

DESCRIPTION OF THE PREFERRED EMBODIMENTS

Preferred embodiments of the present invention will now be described in detail in accordance with the accompanying drawings.

Figure 1:
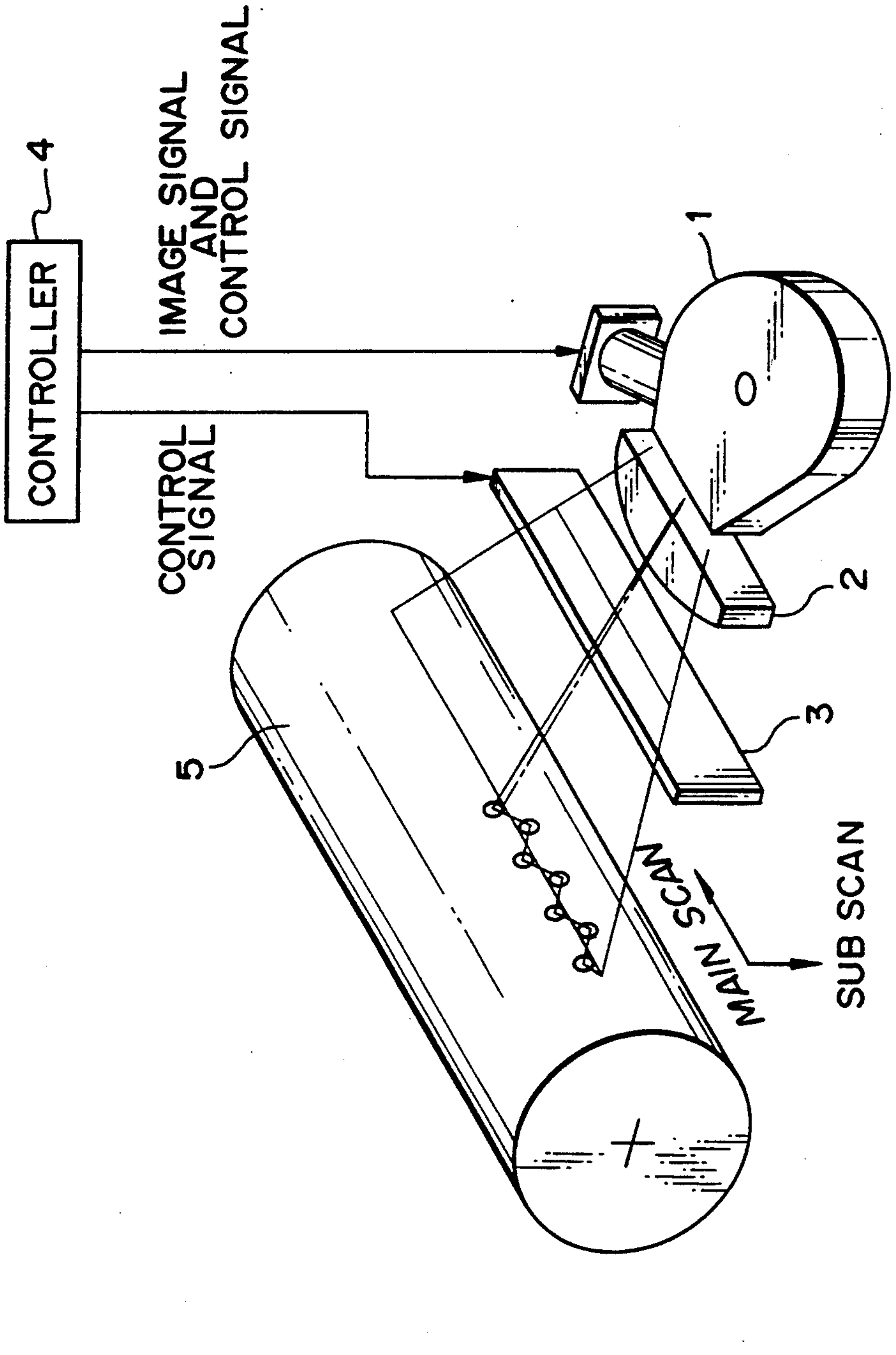
FIG. 1 is a block diagram illustrating the construction of an image forming apparatus which is a typical embodiment of the present invention.

FIG. 1 is a block diagram illustrating the construction of an image forming apparatus which is a typical embodiment of the present invention. In the image forming apparatus of FIG. 1, a laser beam generated by a laser light source accommodated within a laser scanner 1 is diverted by a polygonal mirror within the laser scanner 1 in a main scanning direction and optically converted into the beam which scans a photoreceptor drum 5 at a uniform speed by an f/θ lens 2, whereupon the beam is focused on the photoreceptor drum 5 to expose a photoreceptor, thereby forming an electrostatic latent image. A beam deflector 3 is disposed on the optical path of the laser. In the present embodiment, an electric optical device is employed as the beam deflector 3. Whereas the laser scanner 1 performs scanning in the main scanning direction, the function of the beam deflector 3 is to displace the laser spot a minute distance, e.g., a distance ranging from a half dot to one dot, in the sub-scanning direction, as depicted in FIG. 1.

Figure 2A:
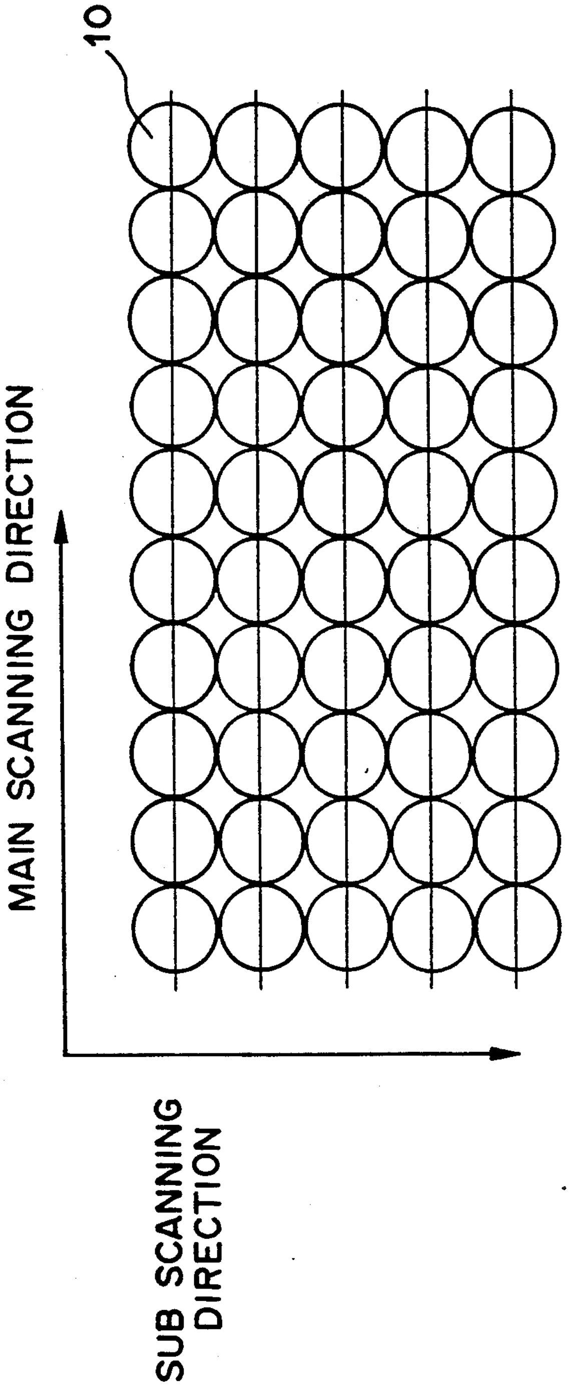
FIG. 2A, is a diagram illustrating a lattice-like pixel array.
Figure 2B:
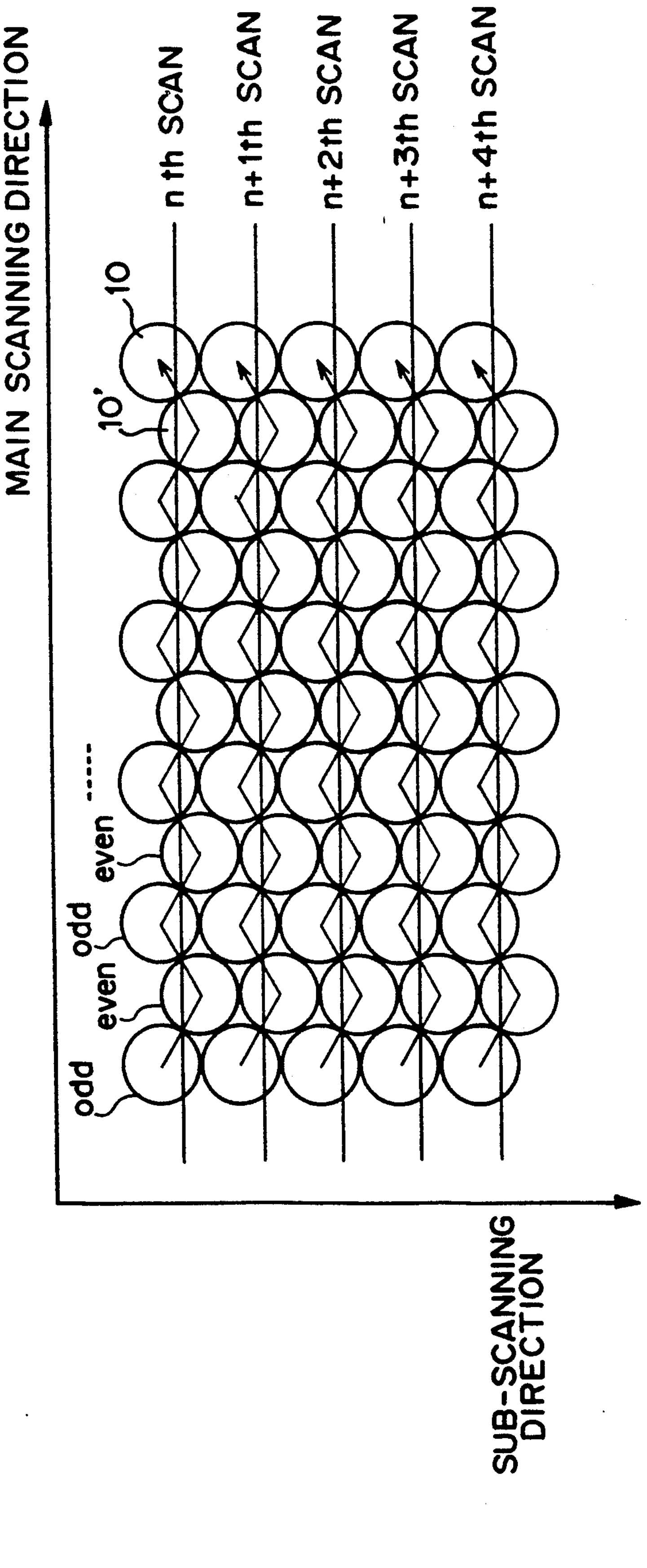
FIG. 2B is a diagram illustrating a pixel array obtained by control for minute deflection in the sub-scanning direction.

By thus deflecting the laser beam a minute distance in the sub-scanning direction, the dot array of the laser spot exposed by the laser beam becomes as shown in FIG. 2B. When this diagram is compared with a dot array (FIG. 2A) obtained by laser deflection in accordance with the prior art, it is seen that whereas dots 10 have a simple lattice-like array with the prior-art method, the dots in this embodiment are capable of being arrayed as dots 10' by applying the minute deflection in the sub-scanning direction. In other words, the spacing between neighboring dots is reduced, as a result of which the image quality obtained is enhanced to achieve a higher density.

Figure 3A:
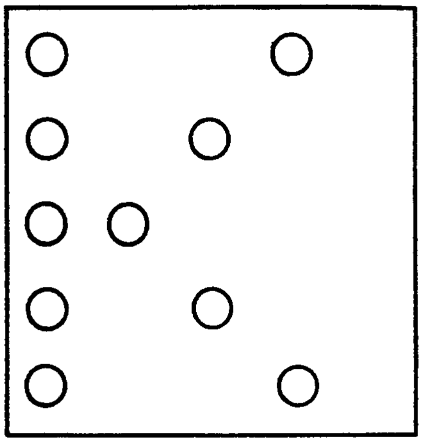
FIGS. 3A, 3B, 3C, 3D and 3E are diagrams illustrating pixel arrays taking, as specific examples, a character pattern "K" and a cross-like graphic pattern.
Figure 3B:
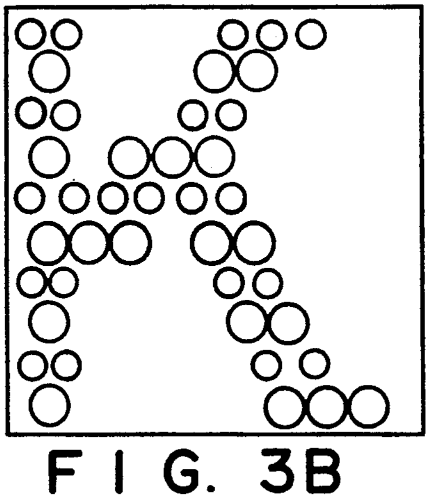
Figure 3C:
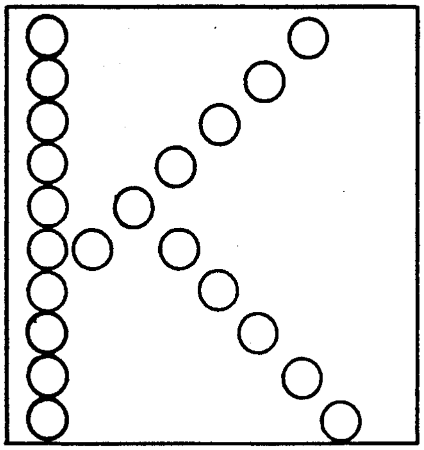
Figure 3D:
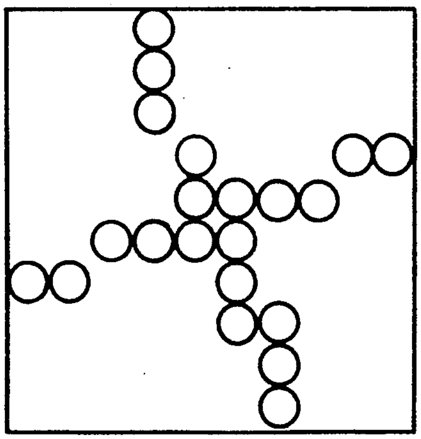
Figure 3E:
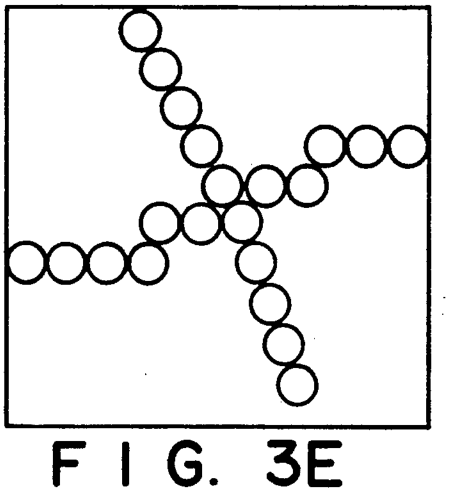

FIGS. 3A through 3E illustrate this principle taking the character pattern "K" and a cross-like pattern as specific examples. FIGS. 3A through 3C relate to the character pattern "K", and FIGS. 3D and 3E relate to the cross-like pattern. First, with reference to FIGS. 3A through 3C, the character pattern "K" shown in FIG. 3B expresses the character font more richly than the character pattern "K" in accordance with the prior-art example of FIG. 3A. Also, when FIG. 3C, which is expressed merely by doubly increasing density is compared with FIGS. 3B, , it is clearly seen that oblique lines expressed in FIG. 3B have a smoother, more natural representation, as a result of which overall printing quality is enhanced. When the graphic image of the cross-like pattern in accordance with the prior-art example of FIG. 3D and the graphic image of the cross-like pattern shown in FIG. 3E are compared, it is clearly seen that the reproducibility of the original image is improved in FIG. 3E.

Control of dot array by minute deflection of the laser beam in the sub-scanning direction will now be described.

Figure 4:
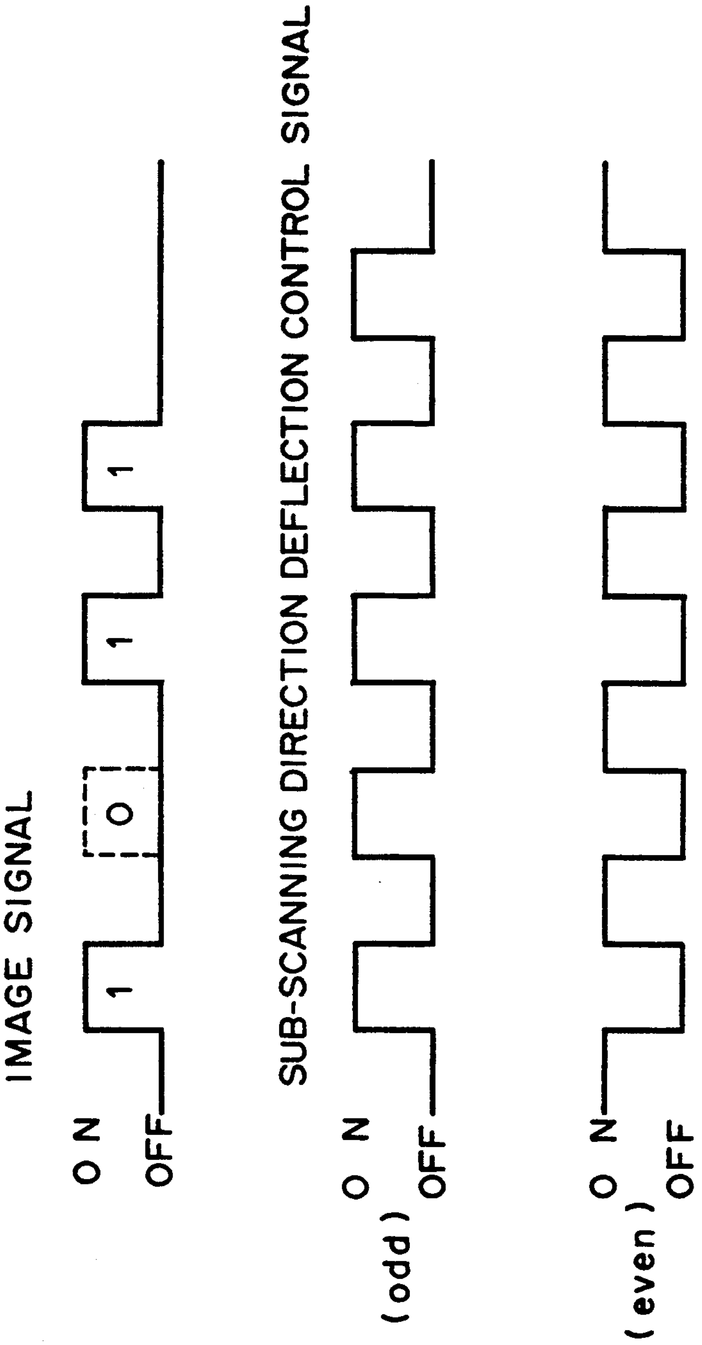
FIG. 4 is a diagram shows a timing chart of an image signal and sub-scanning direction deflection control signals.

In principle, in a case where one line of image data of one pixel bits is considered, control is performed in such a manner that voltages of mutually opposing polarities are applied to EOD electrodes of odd-numbered pixels and even-numbered pixels, counting from a reference point. FIG. 4 is a timing chart showing control of deflection in the sub-scanning direction by means of a controller 4 shown in FIG. 1. When the image signal in FIG. 4 is ON, this means that the bit is off; when the image signal is OFF, this means that the bit is off. When a sub-scanning direction deflection control signal (hereinafter referred to as a deflection control signal) is ON, this means that a positive voltage is applied to the electrode on one side (hereinafter referred to as the A side) of the EOD; when the deflection control signal is OFF, this means that a negative voltage is applied to the electrode on the A side of the EOD. In this embodiment, the deflection control signals are synchronized and the laser beam is repeatedly deflected every pixel in the sub-scanning direction in one-pixel units of the image signal.

FIGS. 5A and 5B illustrate deflection of the laser beam by such deflection control. FIGS. 5A and 5B respectively illustrate the manner in which a laser beam 7 is deflected upwardly and downwardly, relative to the sub-scanning direction, by dθ from a center line. In FIG. 5A, the EOD 3 has the positive voltage applied to the electrode 13 on the A side and the negative voltage applied to the electrode 13 on the B side. In FIG. 5B, the negative voltage is applied to the electrode 13 on the A side and the positive voltage is applied to the electrode 13 on the B side. Thus, the laser beam is deflected in two directions of the sub-scanning direction by the polarities of the voltages applied to the electrodes.

Described next will be control of focal-point fluctuation accompanying the control for deflecting the laser beam in the sub-scanning direction. In general, the focal depth of a laser beam is large (on the order of 1 mm). Consequently, image quality does not undergo a major change owing to slight displacement (on the order of 10 μm) of the photoreceptor. However, since the drum-shaped photoreceptor 5 of the kind shown in FIG. 1 and 6A is used in the present embodiment, a situation can be conceived in which the focal point departs from the surface of the photoreceptor owing to displacement of the laser beam in the sub-scanning direction, as a result of which the size of the dot formed by the laser beam differs depending upon the direction of laser beam deflection. In other words, a situation can arise in which the size of the dot formed by the laser beam deflected upwardly relative to the sub-scanning direction differs from the size of the dot formed by the laser beam deflected downwardly relative to the sub-scanning direction are not always equal. In order to prevent this, the laser source accommodated within the laser scanner 1 is arranged in such a manner that a distance $l_1$ between the laser source and the position of the dot formed by the laser beam deflected upwardly relative to the sub-scanning direction will be equal to the distance $l_2$ between the laser source and the position of the dot formed by the laser beam deflected downwardly relative to the sub-scanning direction. As a result of this expedient, a fluctuation in the focal point due to light deflection can be eliminated and the sizes of the dots can be equalized. In FIG. 6A, numeral 5' denotes a substrate of the photoreceptor drum.

In order to achieve more precise equalization of dot size, two control operations are carried, as will now be described.

Figure 7:
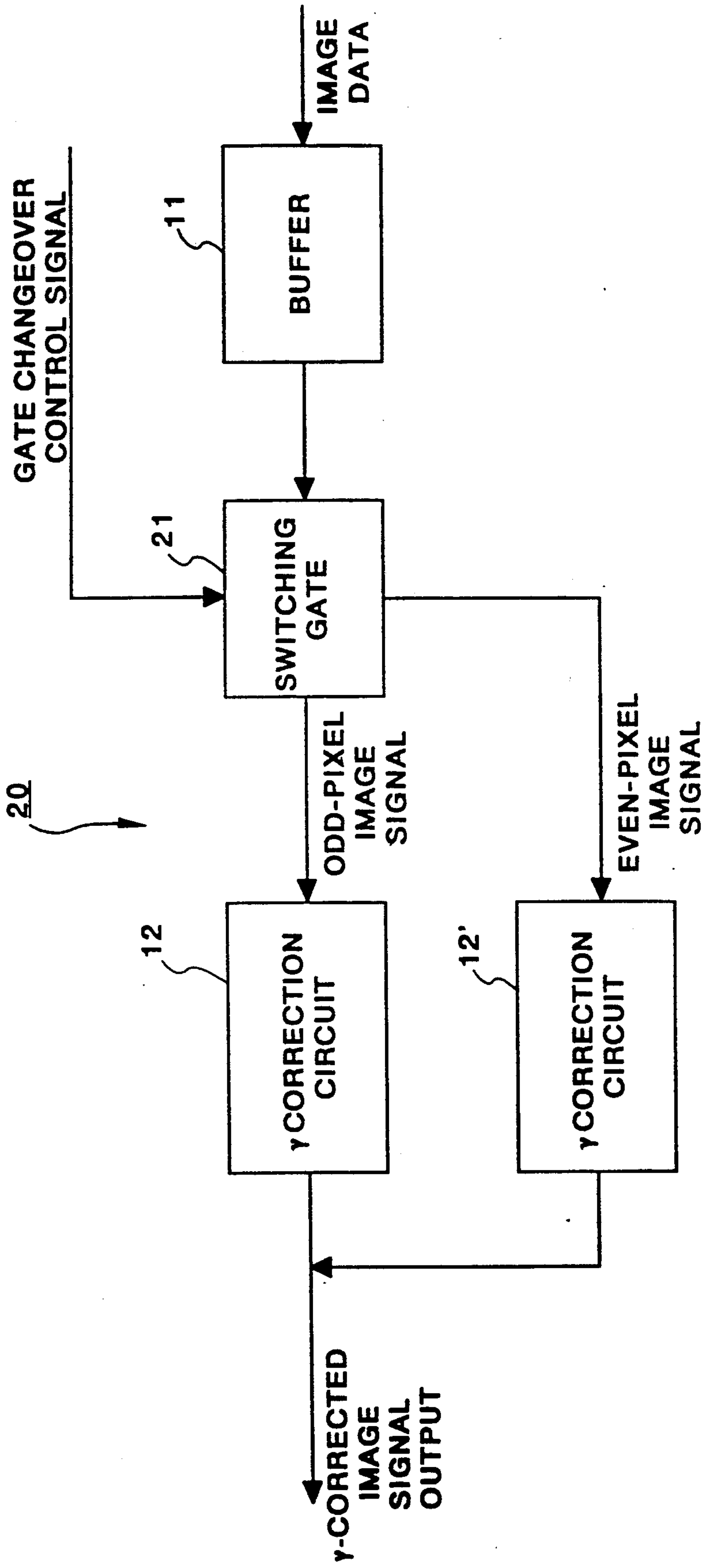
FIG. 7 is a block diagram showing the construction of a dot-size adjustment section which controls the strength of laser light emission by applying a $\gamma$ correction.
Figure 8B:
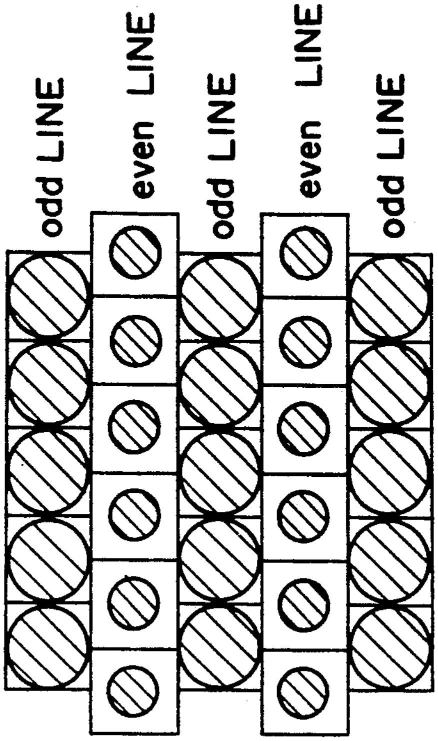
FIGS. 8A and 8B are diagrams illustrating specific examples of dot-size adjustment by a $\gamma$ correction.

The first control operation is for changing the intensity of laser-light emission using a γ correction. FIG. 7 is a block diagram showing the construction of a dot-size adjustment unit 20 for controlling the intensity of laser-light emission by a γ correction. FIG. 8B is a diagram illustrating a difference in dot size due to a difference in the degree of laser-beam deflection to both sides of the sub-scanning direction. FIG. 8B is shown in exaggerated form in order to describe the difference in dot size. In actuality, the size of the recorded dots of even-numbered pixels recorded differs only slightly from the size of the recorded dots of odd-numbered pixels. Assuming that the odd-numbered pixels are deflected upwardly relative to the sub-scanning direction and the even-numbered pixels downwardly relative to the sub-scanning direction, in effect a two-line image is formed from a single line of an inputted image signal. Accordingly, with regard to the dot array that forms the image, odd-numbered pixels can be considered to form odd-numbered lines and even-numbered pixels can be considered to form even-numbered lines, counting from a certain reference line. FIG. 8B shows an example in which the dot size of even-numbered lines formed from even-numbered pixels is smaller than the dot size of odd-numbered lines formed from odd-numbered pixels.

Figure 8A:
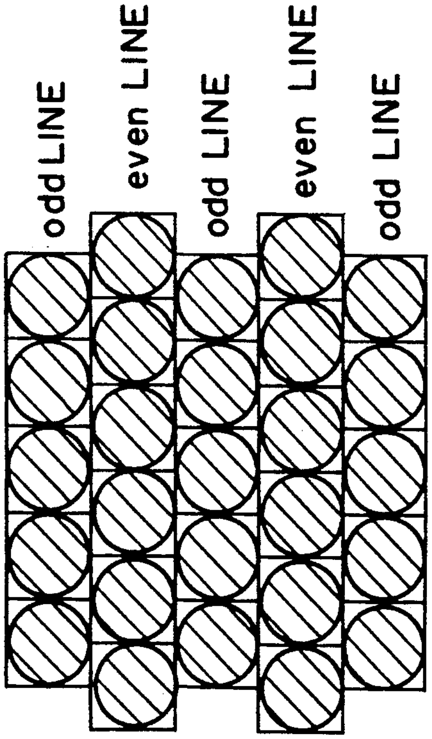

To deal with to this variation in dot size, the image signal is stored in a buffer 11 of the dot-size adjustment unit 20, after which a switching gate 21 transmits the image signal to a $\gamma$ correction circuit 12 for dots on odd-numbered lines. The $\gamma$ correction circuit 12 then performs a $\gamma$ correction to increase the laser emission intensity and enlarge dot size to some extent. For dots on even-numbered lines, the switching gate 21 transmits the image signal to a $\gamma$ correction circuit 12'. The $\gamma$ correction circuit 12' then performs a $\gamma$ correction to decrease the laser emission intensity and reduce dot size to some extent. An example of such dot-size equalization is shown in FIG. 8A. In actuality, the dot sizes will be substantially equalized if either the even-numbered or odd-numbered lines are taken as a reference, the $\gamma$ correction is applied to either of these lines and drive of the laser light source is controlled so as to change the intensity of laser emission.

Figure 9A:
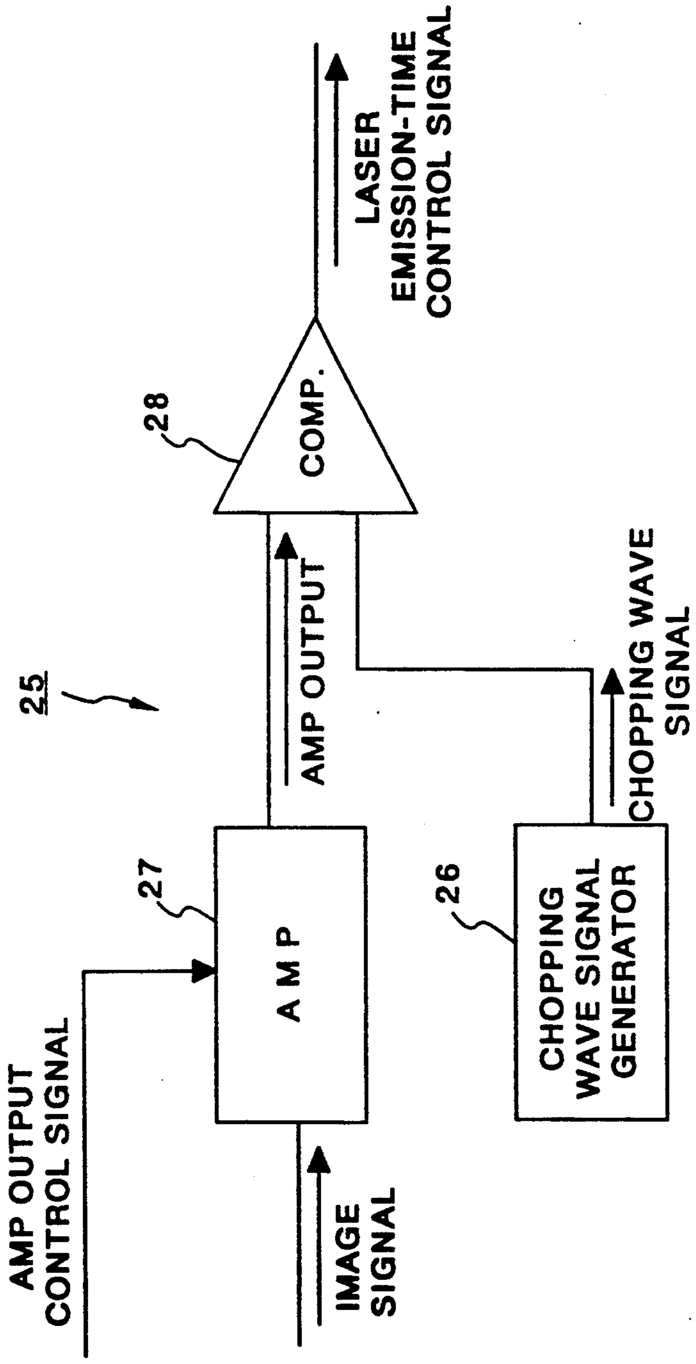
FIG. 9A is a block diagram illustrating the construction of a laser emission-time controller.

Since the range of dot-size adjustment performed by the $\gamma$ correction is not that broad, a second control operation is carried out in order to perform the dot-size adjustment over a wider range. The second control operation is for controlling laser emission time by pulse-width modulation. FIG. 9A is a block diagram showing the construction of a laser emission-time controller 25. The laser emission-time controller 25 also is incorporated in the controller 4. As shown in FIG. 9A, the laser emission-time controller 25 comprises a chopping wave signal generator 26, an operational amplifier 27 for controlling the amplitude of the image signal, and a comparator 28.

As illustrated in FIG. 9B, the output of the operational amplifier 27 in the laser emission-time controller 25 is controlled in such a manner that a high-level output ($V_{odd}$) is delivered if an image signal of an odd-numbered pixel is inputted to the operational amplifier 27, while a low-level output ($V_{even}$) is delivered if an image signal of an even-numbered pixel is inputted to the operational amplifier 27. Meanwhile, the chopping wave signal generator 26 outputs a chopping wave signal having a fixed period. When these two outputs are applied to the comparator 28, a laser emission-time control signal having a short emission time ($t_{odd}$) is outputted in case of the image signal of an odd-numbered pixel, as shown in FIG. 9B. On the other hand, a laser emission-time control signal having a long emission time ($t_{even}$) is outputted in case of the image signal of an even-numbered pixel. The laser emission time is controlled by thus controlling the output of the operational amplifier 27 with regard to each of the odd- and even-numbered pixels. Since the laser emission time corresponds to the dot size, the result is that the dot sizes of each of the odd- and even-numbered pixels are adjusted.

Accordingly, in a case where dot size is small, the output of the operational amplifier 27 is reduced to lengthen the laser emission time corresponding to one dot of the image signal, whereby the sizes of the odd- and even-numbered pixels can be equalized.

Thus, as described above, a high-quality image having a much more uniform dot size can be obtained by controlling the laser emission intensity and laser emission time.

In the present embodiment, a case has been described in which the laser scanner 1 is arranged on the outer side of the drum. However, as shown in FIG. 6B, it is possible to equalize $l_1$ and $l_2$ by disposing the laser scanner 1 inside the drum and placing the laser scanner on the center of curvature of the photoreceptor drum.

Further, in the present embodiment, an example is described in which the EOD constituted by the beam deflector 3 is disposed on the front side of the laser scanner, as shown in FIG. 1, whereby control is performed to shift the dot array a half dot every line, as described earlier. However, the present invention is not limited to this embodiment, for the same effects can be obtained even if the EOD is disposed immediately in back of the laser source.

Furthermore, in the present embodiment, a case is described in which the EOD is employed as the beam deflector 3. However, this does not impose a limitation upon the invention. For example, it is also possible to use an acoustic optical device (AOD) or a mechanical optical device.

OTHER EMBODIMENT

An image forming apparatus capable of utilizing a dot-size adjustment in the formation of a multi-tone image will now be described. In this embodiment, the image forming apparatus described in connection with the foregoing embodiment is used. Therefore, the same reference numerals and symbols are used and a description of similar parts is omitted unless otherwise mentioned.

Figure 10:
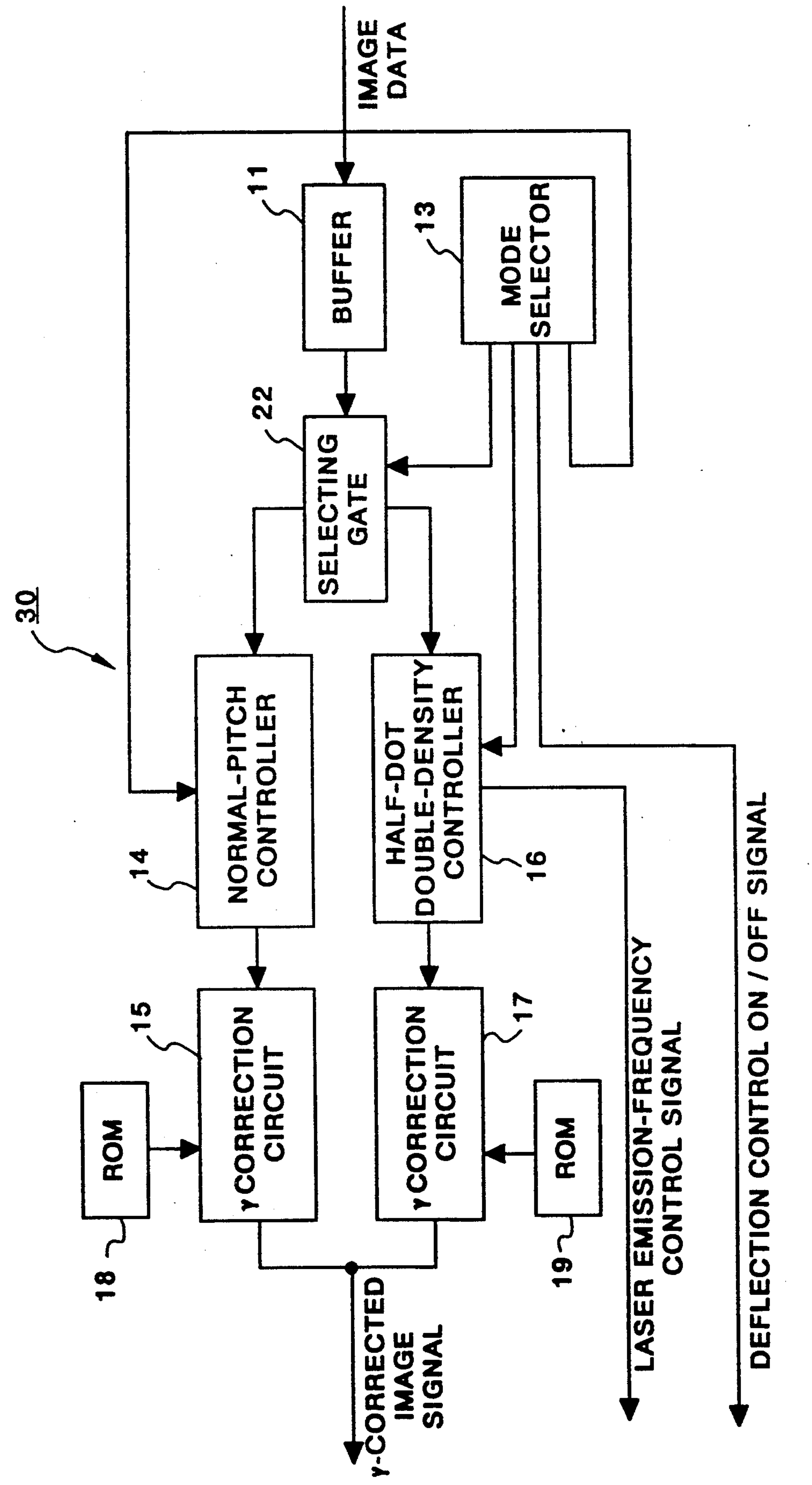
FIG. 10 is a block diagram showing the construction of a dot-size controller according to another embodiment.

FIG. 10 is a block diagram illustrating the construction of a dot-size controller 30 characterizing this embodiment and used upon being incorporated in the controller 4 of the image forming apparatus. The dot-size controller 30 of this embodiment is constructed by adding a mode selector 13, a normal-pitch controller 14, a half-dot double-density controller 16, ROM's 18, 19 and a data selecting gate 22 to the dot-size adjusting unit 20 described in the foregoing embodiment. Different laser emission intensity control tables for $\gamma$ corrections are stored in the ROM's 18, 19.

Figures 11A, 11B, 11C:
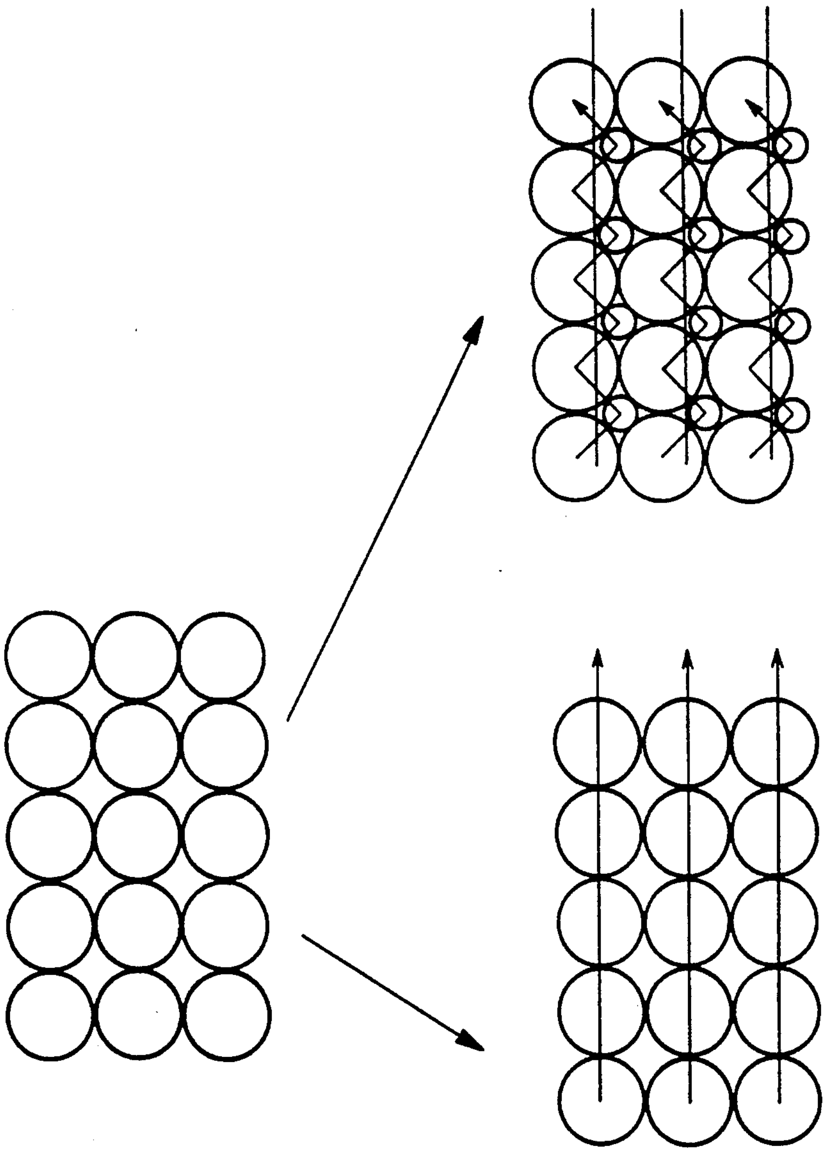
FIGS. 11*a*–11*c* are block diagrams showing a specific example of the pixel array of a multi-tone image.

In the dot-size controller 30 thus constructed, formation of a different image is performed in accordance with changeover of the mode selector 13 when a multi-tone image signal such as that of a dither pattern of the kind shown in FIG. 11(*a*), by way of example, is inputted.

First, when the selector 13 selects the normal-pitch mode, the mode selector 13 sends a deflection-control OFF signal to the beam deflector 3 to halt deflection control in the sub-scanning direction, and sends a control signal to the data selecting gate 22. In response, the data selecting gate 22 transfers the image signal, which enters via the buffer 11, to the normal-pitch controller 14. At this time the image signal is not transferred to the half-dot double-density controller 16. Next, the normal-pitch controller 14 performs control in such a manner that the input image signal is outputted upon being subjected to a $\gamma$ correction, based on the laser emission intensity control table stored in ROM 18, by a $\gamma$ correction circuit 15. As a result, an image having the dot array shown in FIG. 11(*b*) is formed.

Next, when the mode selector 13 selects the half-dot double-density mode, the mode selector, in addition to performing the formation of the image of the normal pixel arrangement described above, sends a deflection-control ON signal to the beam deflector 3 to perform deflection control in the sub-scanning direction, and sends a control signal to the data selecting gate 22. In response, the data selecting gate 22 transfers the image-signal data of the same line and same pixel as the image-signal data transferred to the normal-pitch controller 14 also to the half-dot double-density controller 16. The latter then transmits the deflection-control ON signal and performs control in such a manner that a dot of half-dot size is outputted following a $\gamma$ correction performed by a $\gamma$ correction circuit 17 based on the laser emission intensity control table stored in ROM 19. As a result, the dot-size controller 30 outputs both dots of ordinary size and dots of half-dot size with regard an image signal of the same line and same pixel. Furthermore, at this time the half-dot double-density controller 16 transmits a laser emission frequency control signal to the laser scanner 1 to effect control in such a manner that the frequency of laser emission is doubled in comparison with that which prevailed in the normal-pitch mode. Since control for deflection in the sub-scanning direction is carried out in this mode, dots of ordinary size are formed when the laser beam is deflected toward the upper side of the sub-scanning direction, and dots of the half-dot size are formed when the laser beam is deflected toward the lower side of the sub-scanning direction. Thus, by changing over the mode, an image composed of a dot array having a dot density double that of the normal pixel arrangement is formed, as shown in FIG. 11(*c*).

Thus, in accordance with the present embodiment, dot size is changed with regard to image data of the same pixel, and an image can be formed at a doubled dot density. As a result, the capability at which, say, the tonality of an image is expressed can be enhanced.

Figure 12:
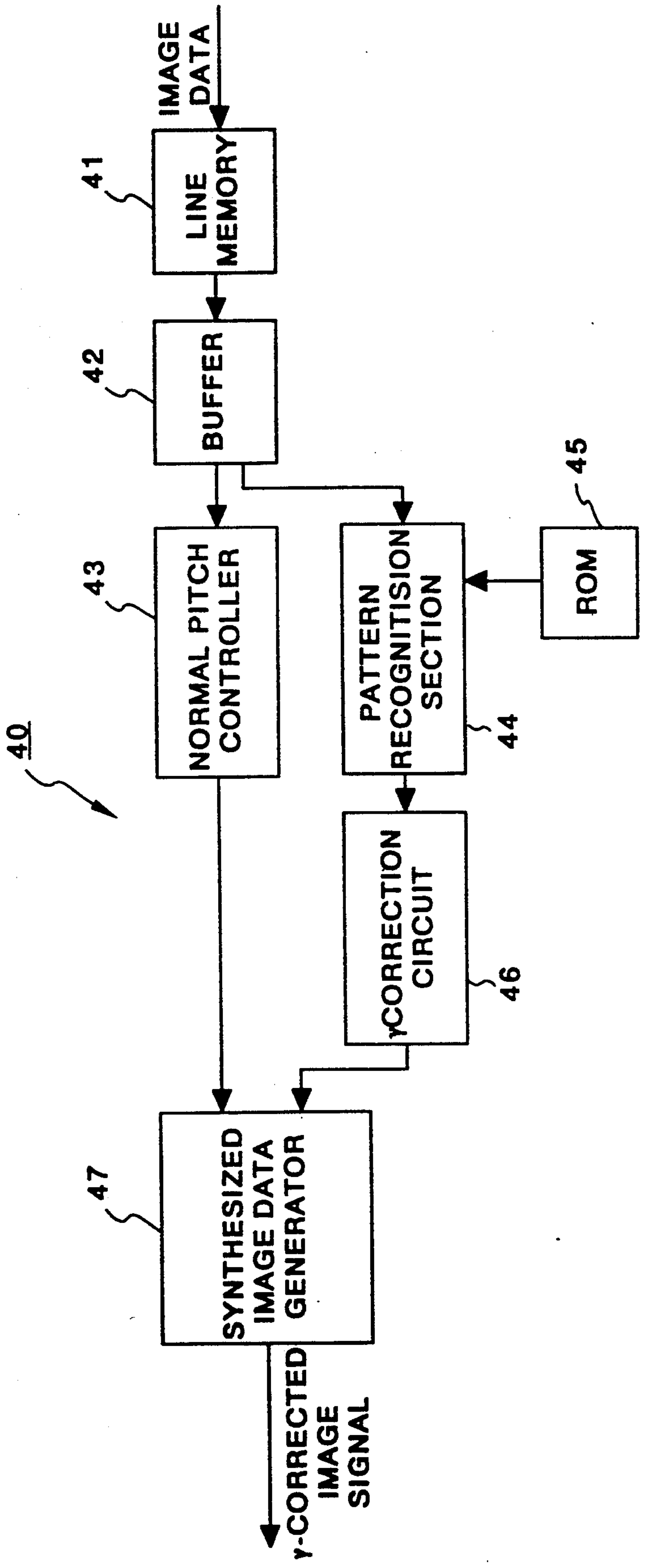
FIG. 12 is a block diagram showing the construction of a dot-size generation controller according to another embodiment.
Figure 13A:
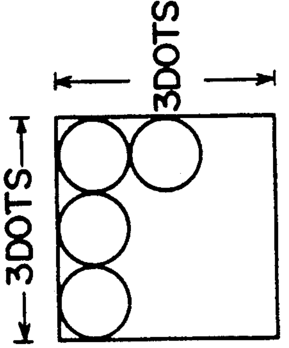
FIGS. 13A*a*–13A*b*, 13B*a*–13B*b*, 13C*a*–13C*b* and 13D*a*–13D*b* are diagrams illustrating another specific examples of the partial pixel arrays of character font.
Figure 13A:
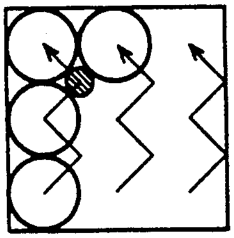
Figure 13B:
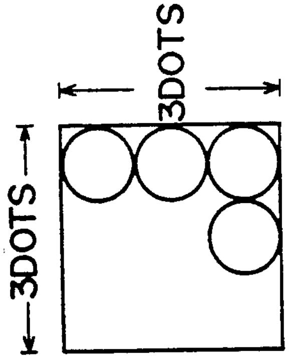
Figure 13B:
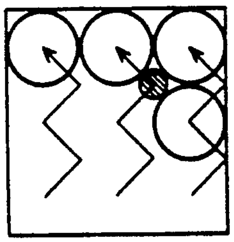
Figure 13C:
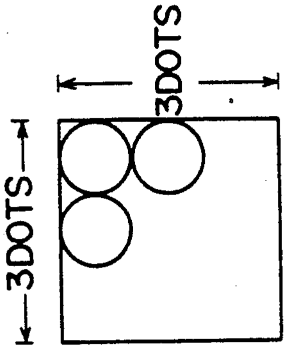
Figure 13C:
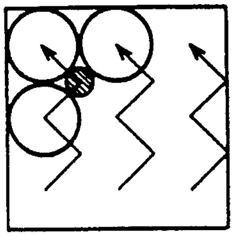
Figure 13D:
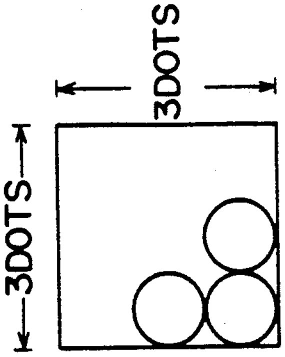
Figure 13D:
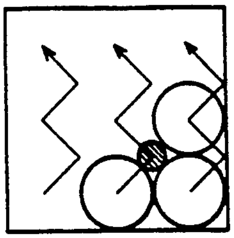

Further, by making use of neighbouring image pixel data, it is possible to control the deflection of the light beam and its intensity. FIG. 12 is a block diagram illustrating the construction of a dot generation controller 40 which is incorporated in controller 4 of the image forming apparatus. As shown in FIG. 12, the dot generation controller 40 comprises a line memory 41 for storing 3 lines of image data, a buffer 42 for storing 3 dot by 3 dot image data, a normal pitch controller 43, a pattern recognition section 44 for identifying particular dot patterns as shown in FIGS. 13A(*a*), 13B(*a*), 13C(*a*) and 13D(*a*), and for generating a dot of smaller size, a ROM 45 for storing the dot patterns, a $\gamma$ correction circuit 46 and a synthesized image data generator 47.

In the dot generation controller 40 thus comprised, formation of a dot pattern is performed in accordance with input image data. First, buffer 42 receives the image data 3 dots in a row by 3 dots in a column at a time from the line memory 41. In response, buffer 42 transfers the image data to both the normal pitch controller 43 and the pattern recognition section 44. Next, the normal pitch controller 43 performs control in a manner such that the input data is output to the synthesized image data generator 47. Contrastingly, the pattern recognition section 44 performs control in a manner such that the input image data is compared to the particular dot patterns stored in the ROM 45. If the pattern recognition section 44 determines that the input image data is the same as one of the particular dot patterns in the ROM 45, the pattern recognition section 44 performs further control in a manner such that a dot of smaller dot size, which is depicted as a shaded circle in FIGS. 13A(*b*), 13B(*b*), 13C(*b*) and 13D(*b*), is output, following a $\gamma$ correction performed by the $\gamma$ correction circuit 46, to the synthesized image data generator 47. If no particular dot pattern is identified from the input image data, the pattern recognition section 44 terminates its operation without performing further control. Finally, the synthesized image data generator 47 synthesizes the output data from both the normal pitch controller 47 and the pattern recognition section 44 into an $\gamma$-corrected image signal. As the result, the dot generation controller 40 outputs modified image data representing the input image data as shown in FIGS. 13A(*b*), 13B(*b*), 13C(*b*) and 13D(*b*), in the case where the input image data contains one of the particular dot patterns.

Thus, with the dot generation controller 40, an image composed partially of a dot array with a dot density double that of the normal pixel arrangement is formed. As the result, an edge portion of image pattern can be smoothly expressed.

Furthermore, by utilizing the mean value of neighboring image data in relation to the main scanning direction or sub-scanning direction, dots having a half-dot size can be formed, and dot size can be changed at will to achieve expression. This makes possible tone expression of a finer image.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus in which a light beam is adapted as an exposure source, comprising:

light-emitting means for emitting the light beam;

photoreceptive means on which a latent image is formed in correspondence with a beam spot formed by irradiating the photoreceptive means with the light beam;

scanning means for scanning the light beam, which is emitted by said light-emitting means, so as to scan said photoreceptive means;

beam deflecting means for deflecting the beam spot a minute distance in a sub-scanning direction while the light beam is being deflected in a main scanning direction; and control means for controlling said beam deflecting means in a manner such that a deflected beam spot is formed between two beam spots neighboring each other in the main scanning direction in a given main scanning line, the deflected beam spot being at a position shifted in the sub-scanning direction from the main scanning line where the two neighboring beam spots are located.

2. The apparatus according to claim 1, wherein said light-emitting means has laser-emitting means.

3. The apparatus according to claim 1, wherein said minute distance the beam spot is deflected in the sub-scanning direction by said beam deflecting means approximately one pixel or less.

4. The apparatus according to claim 1, wherein said photoreceptive means has a photoreceptor drum, and a center of curvature of said photoreceptor drum is situated on a center line of deflection by said beam deflecting means.

5. The apparatus according to claim 4, wherein said photoreceptor drum has a light-transmissive photoreceptor substrate, and exposure and latent-image formation are carried out on said photoreceptor drum from the back side of said photoreceptor substrate.

6. The apparatus according to claim 1, wherein said photoreceptive means has a photoreceptor drum, and a center of curvature of said photoreceptor drum is situated on a center line of deflection by said beam deflecting means, and a light source of the light beam of said light-emitting means is situated on the center of curvature of said photoreceptor drum.

7. The apparatus according to claim 6, wherein said photoreceptor drum has a light-transmissive photoreceptor substrate, and exposure and latent-image formation are carried out on said photoreceptor drum from the back side of said photoreceptor substrate.

8. The apparatus according to claim 1, wherein an angle of deflection, from a center of deflection, of the light beam deflected by said beam deflecting means is approximately equal to an angle of deflection, from a center of deflection, of a light beam deflected in a direction opposite that of the first-mentioned deflected light beam.

9. The apparatus according to claim 1, wherein said beam deflecting means has an electric optical device or an acoustic optical device.

10. The apparatus according to claim 1, wherein said control means comprises:

input means for inputting image data; and light-beam emission-intensity control means for controlling emission intensity of the light beam based upon the image data.

11. The apparatus according to claim 10, wherein said control means further comprises:

changeover means changed over in such a manner that deflection of the light beam by said beam deflecting means is or is not performed;

pixel density control means for controlling pixel density by forming a new latent image of the beam spot based upon image data input by said input means; and light-beam emission-frequency control means for controlling emission frequency of the light beam based on pixel density controlled by said pixel density control means.

12. The control apparatus according to claim 10, wherein said light-beam emission-intensity control means control the emission intensity of the light beam in correspondence with each pixel of the image data.

13. The control apparatus according to claim 12, wherein the emission intensity of the light beam is controlled by a $\gamma$ correction.

14. The apparatus according to claim 1, wherein said control means comprises:

input means for inputting image data; and light-beam emission-time control means for controlling emission time of the light beam based upon the image data.

15. The control apparatus according to claim 14, wherein said light-beam emission-time control means control the emission time of the light beam in correspondence with each pixel of the image data.

16. The control apparatus according to claim 15, wherein the emission time of the light beam is controlled by pulse-width modulation.

17. The apparatus according to claim 1, further comprises:

input means for inputting image data; and wherein said control means deflects the light beam based on the input image data by said beam deflecting means.

18. An image forming apparatus in which a light beam is adopted as an exposure source, comprising:

input means for inputting image data;

light-emitting means for emitting the light beam;

photoreceptive means on which a latent image is formed in correspondence with a beam spot formed by irradiating the photoreceptive means with the light beam;

scanning means for scanning the light beam, which is emitted by said light-emitting means, so as to scan said photoreceptive means at a uniform speed;

beam deflecting means for deflecting the beam spot a minute distance in a sub-scanning direction while the light beam is being deflected in a main scanning direction; and control means for controlling said beam deflecting means in accordance with the input image data input by said input means in a manner such that a deflected beam spot is formed between two beam spots neighboring each other in the main scanning direction in a given main scanning line, the deflected beam spot being at a position shifted in the sub-scanning direction from the main scanning line where the two neighboring beam spots are located.

19. The apparatus according to claim 18, wherein said light-emitting means has laser-emitting means.

20. The apparatus according to claim 18, wherein said minute distance the beam spot is deflected in the sub-scanning direction by said beam deflecting means approximately one pixel or less.

21. The apparatus according to claim 18, wherein said control means controls said light-emitting means in accordance with the inputted image data.

22. The apparatus according to claim 18, wherein said beam deflecting means has an electric optical device or an acoustic optical device.

23. The apparatus according to claim 18, wherein said control means comprises:

input means for inputting image data;

light-beam emission-intensity control means for controlling emission intensity of the light beam based upon the image data.

* * * * *

UNITED STATES PATENT AND TRADEMARK OFFICE
CERTIFICATE OF CORRECTION

PATENT NO. : 5,182,575

DATED : January 26, 1993

INVENTOR(S) : Motoi Kato and Yoshitake Nagashima

It is certified that error appears in the above-identified patent and that said Letters Patent is hereby corrected as shown below:

Column 8, line 33, change "adapted" to --adopted--.

Signed and Sealed this

Eleventh Day of January, 1994

Attest:

BRUCE LEHMAN

*Attesting Officer*

*Commissioner of Patents and Trademarks*